(12) United States Patent
Apostoloiu et al.

(10) Patent No.: US 7,506,211 B2
(45) Date of Patent: Mar. 17, 2009

(54) AUTOMATED ATOMIC SYSTEM TESTING

(75) Inventors: Laura Ioana Apostoloiu, Markhanm (CA); Philip Arthur Day, Thornhill (CA); Behrad Ghazizadeh, Markham (CA)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 11/225,360

(22) Filed: Sep. 13, 2005

(65) Prior Publication Data

US 2007/0061624 A1    Mar. 15, 2007

(51) Int. Cl.
*G06F 11/00* (2006.01)
(52) U.S. Cl. .................. 714/38; 714/33; 717/124
(58) Field of Classification Search .......... 714/33, 714/38, 26, 47, 48, 25; 717/124, 127, 126
See application file for complete search history.

(56) References Cited

U.S. PATENT DOCUMENTS

| | | | |
|---|---|---|---|
| 4,682,330 A | 7/1987 | Milham | |
| 5,357,523 A | 10/1994 | Bogholtz et al. | |
| 5,421,004 A * | 5/1995 | Carpenter et al. | 714/25 |
| 5,500,941 A * | 3/1996 | Gil | 714/38 |
| 5,542,043 A * | 7/1996 | Cohen et al. | 714/32 |
| 5,629,878 A * | 5/1997 | Kobrosly | 702/120 |
| 5,634,098 A | 5/1997 | Janniro et al. | |
| 6,002,869 A | 12/1999 | Hinckley | |
| 6,457,152 B1 | 9/2002 | Paley et al. | |
| 6,601,018 B1 | 7/2003 | Logan | |
| 6,698,011 B1 * | 2/2004 | Reinders et al. | 717/124 |
| 6,701,514 B1 * | 3/2004 | Haswell et al. | 717/115 |
| 6,735,719 B2 | 5/2004 | Moe et al. | |
| 6,829,731 B1 | 12/2004 | LaFauci et al. | |
| 7,237,231 B2 * | 6/2007 | Lambert | 717/127 |
| 2002/0073356 A1 * | 6/2002 | Katayama et al. | 714/4 |
| 2003/0028856 A1 * | 2/2003 | Apuzzo et al. | 717/124 |
| 2003/0078679 A1 | 4/2003 | Sutton | |
| 2003/0208351 A1 * | 11/2003 | Hartman et al. | 703/22 |
| 2003/0212661 A1 * | 11/2003 | Avvari et al. | 707/2 |
| 2004/0025083 A1 * | 2/2004 | Nanja et al. | 714/35 |
| 2005/0081109 A1 * | 4/2005 | Czerwonka | 714/38 |
| 2005/0278576 A1 * | 12/2005 | Hekmatpour | 714/37 |
| 2005/0283694 A1 * | 12/2005 | Shabib et al. | 714/733 |

(Continued)

FOREIGN PATENT DOCUMENTS

JP        2004005399 A   *   1/2004

OTHER PUBLICATIONS

IBM Technical Disclosure Bulletin, "Testcase Automation Method", Aug. 1993, pp. 127-130.

*Primary Examiner*—Gabriel L Chu
*Assistant Examiner*—Chae Ko
(74) *Attorney, Agent, or Firm*—Willy D. A. Rose, Esq.; Steven M. Greenberg, Esq.; Carey Rodriguez Greenberg & Paul LLP

(57) ABSTRACT

Atomic testing of a multiplicity of scenarios includes generating a listing of interacting scenarios which are likely to cause a failure, and testing ones of the scenarios not included in the listing according to a binary search strategy to identify a subset of the scenarios as a source of failure among the scenarios. Additionally, the listing can be updated with newly identified interacting scenarios which are likely to cause a failure.

7 Claims, 3 Drawing Sheets

U.S. PATENT DOCUMENTS

2006/0288256 A1* 12/2006 Mathew et al. ................. 714/38
2007/0016829 A1* 1/2007 Subramanian et al. ........ 714/38
2007/0028217 A1* 2/2007 Mishra et al. ................ 717/124

* cited by examiner

AUTOMATED ATOMIC SYSTEM TESTING

BACKGROUND OF THE INVENTION

1. Field of the Invention

The present invention relates to the field of software testing and more particularly to automated software testing.

2. Description of the Related Art

Automated software testing relates to the functional testing of a software application. Automated testing tools allow end users to create, modify and run functional, distributed functional, regression and smoke tests for applications built using any of a wide variety of integrated development environments. In this regard, the conventional functional testing tool can generate a test script for an application in which the logical components of the application can be exercised both sequentially and conditionally. Through a thorough testing of the application, the automated testing tools can identify defects early, often and repeatably.

While automating the testing process for a simple, localized application can be routine, automating the testing process for a large, complex application which spans multiple computing hosts and involves multiple code sections, configuration files and user interface documents can be problematic to say the least. To address the testing of large, complex applications for stress, scalability and performance, scenarios can be produced which emulate real-world operating conditions for the application. Each scenario can be processed by the testing tool to identify faults in the application. Yet, the sequential processing of scenarios can be time consuming and inefficient—especially where the number of scenarios is great. Specifically, the time required to compose a test bucket, to execute the test bucket and to perform problem determination in the case of a test failure can be substantial.

BRIEF SUMMARY OF THE INVENTION

Embodiments of the present invention address deficiencies of the art in respect to scenario testing and provide a novel and non-obvious method, system and computer program product for atomic testing of scenarios. In one embodiment, a method for the atomic testing of a multiplicity of scenarios can include generating a listing of interacting ones of the scenarios which are likely to cause a failure, and testing ones of the scenarios not included in the listing according to a binary search strategy to identify a subset of the scenarios as a source of failure among the scenarios. Additionally, the method can include updating the listing with newly identified interacting ones of the scenarios which are likely to cause a failure. In this way, the search for failures among scenarios can be optimized by pre-specifying those interacting scenarios which are already suspected as causing a failure.

The generating step can include populating the listing with scenarios that are known to have interaction problems with one another. The testing step, in turn, can include concurrently executing a full set of the scenarios not included in the listing to detect a failure. Responsive to detecting a failure, the full set can be decomposed into subsets, at least one of the subsets can be concurrently executed to detect a failure, and the subsets can be decomposed into further subsets which can be concurrently executed until a subset of scenarios causing the failure can be identified. In this way, the smallest set of scenarios which interact to cause a failure can be identified as part of the determination phase of software testing.

In another embodiment of the invention, a data processing system for the atomic testing of a multiplicity of scenarios can include a testing tool, a probable area of conflict (PAC) list, and atomic testing logic coupled to the testing tool and configured to process the PAC list in identifying scenarios causing failures in testing an application under test in the testing tool. The PAC list can include a listing of scenarios that are known to have interaction problems with one another. Also, the atomic testing logic can include program code configured to test ones of the scenarios not included in the PAC list according to a binary search strategy to identify a subset of the scenarios as a source of the failures.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated atomic system testing. In accordance with an embodiment of the present invention, a listing of possibly conflicting scenarios having interaction problems can be maintained. The interaction problems can arise from correlations in the scenarios such as where both scenarios involve the use of the same resource. Once created, the listing can be utilized during scenario testing to identify likely sources of failures.

In a testing cycle, where the listing cannot identify the likely source of a failure from the concurrent testing of a group of scenarios, those scenarios not included in the listing can be repeatedly decomposed into progressively smaller and smaller sets of atomic testing scenarios to identify the atomic scenario responsible for the failure. In this way, the efficiency of a binary search strategy can be applied to the problem of locating failures resulting from the concurrent execution of different scenarios of a large, complex application under test. As such, concurrently testing each and every combination of scenarios for a failure can be avoided.

Figure 1:
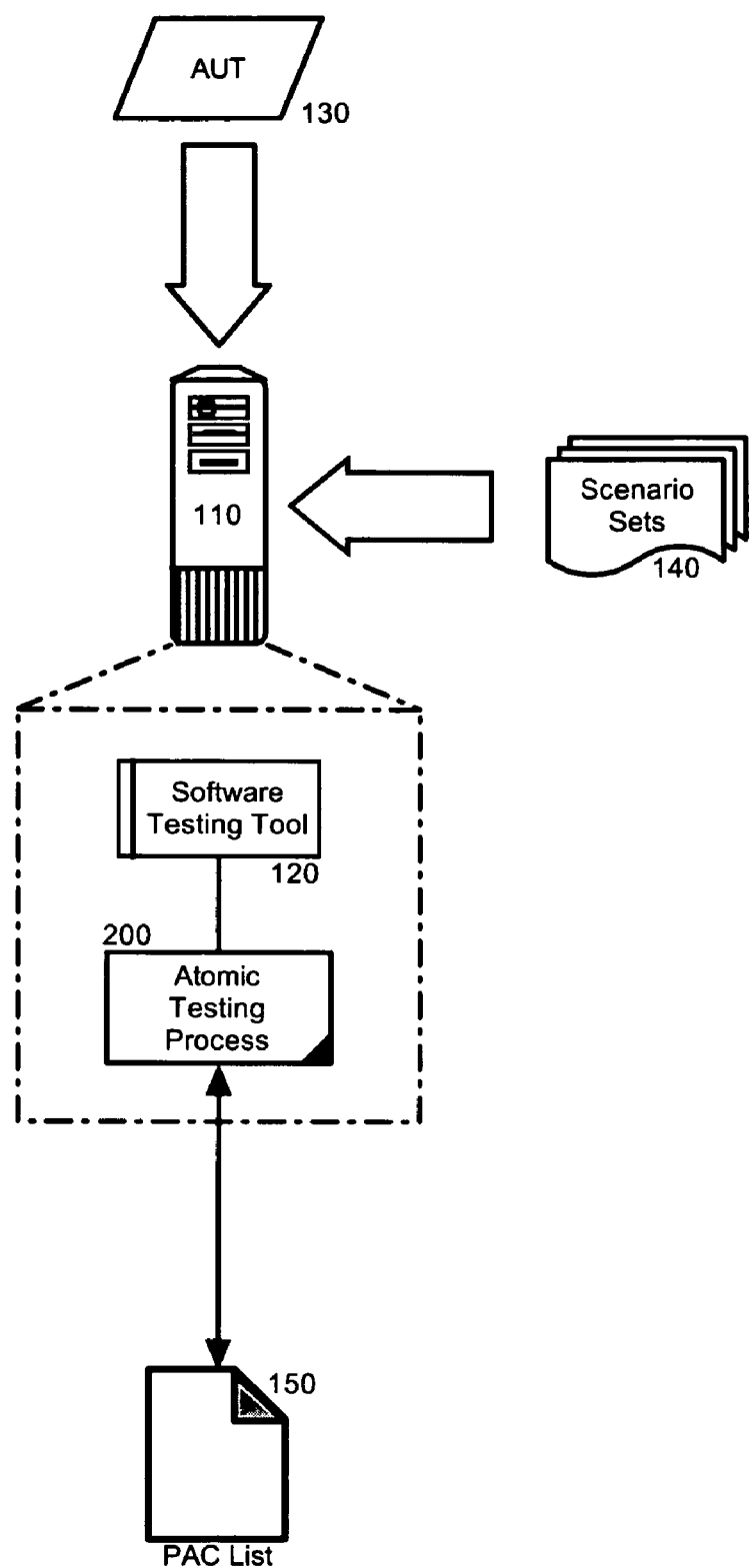
FIG. 1 is a schematic illustration of a data processing system configured for automated atomic system testing.

In illustration, FIG. 1 is a schematic illustration of a data processing system configured for automated atomic system testing. The data processing system can include a data processing test platform 110 configured to host a software testing tool 120. The software testing tool 120 can include program logic for testing an application under test 130 by executing multiple testing scenario sets 140 for the application under test 130. Notably, the atomic testing logic 200 can be coupled to or included as part of the software testing tool 120.

The atomic testing logic 200 can include program logic for breaking the scenario sets 140 into subsets of scenarios, each of the scenario sets including a group of atomic scenarios. Atomic scenarios are testing scenarios which cannot be sub-divided into smaller scenarios. As an example, a shopping scenario can include the atomic scenarios of catalog browsing, shopping cart management and payment processing. The atomic testing logic 200 further can be coupled to a PAC list 150 which both can act as a repository of current test heuristics and also can optimize the search for problem scenarios in an actual test run. In one aspect of the invention, the PAC list 150 can be an input file containing information about scenarios with the potential to cause interaction problems when run concurrently. The PAC list 150 further can be updated over the course of multiple testing cycles such that the PAC list 150 can build over time to incorporate the knowledge of potential failures among scenario combinations. As a result, the PAC list 150 can be a valuable resource apart from its function within the atomic scenario test logic 200.

In operation, all testing scenarios can be executed concurrently together and in response to detecting each failure, the PAC list 150 can be used to identify a subset of atomic scenarios which can be the cause of the failure. Where the PAC list 150 cannot identify a subset of atomic scenarios which can be the cause of the failure, the remaining atomic scenarios not specified by the PAC list 150 can be processed according to a binary search strategy in the atomic testing logic 200 to identify the offending scenario.

Specifically, the remaining atomic scenarios can be executed concurrently, and whenever a failure is detected in one of the atomic scenarios, the detected atomic scenario can be further sub-divided into an additional set of atomic scenarios. The additional set of atomic scenarios can be executed concurrently in order to detect a further failure. The subdividing and testing process can repeat until the smallest set of atomic testing scenarios can be identified which still causes the failure. In this way, the root cause of the failure can be pinpointed without requiring the testing of every possible combination of atomic scenarios.

Figure 2:
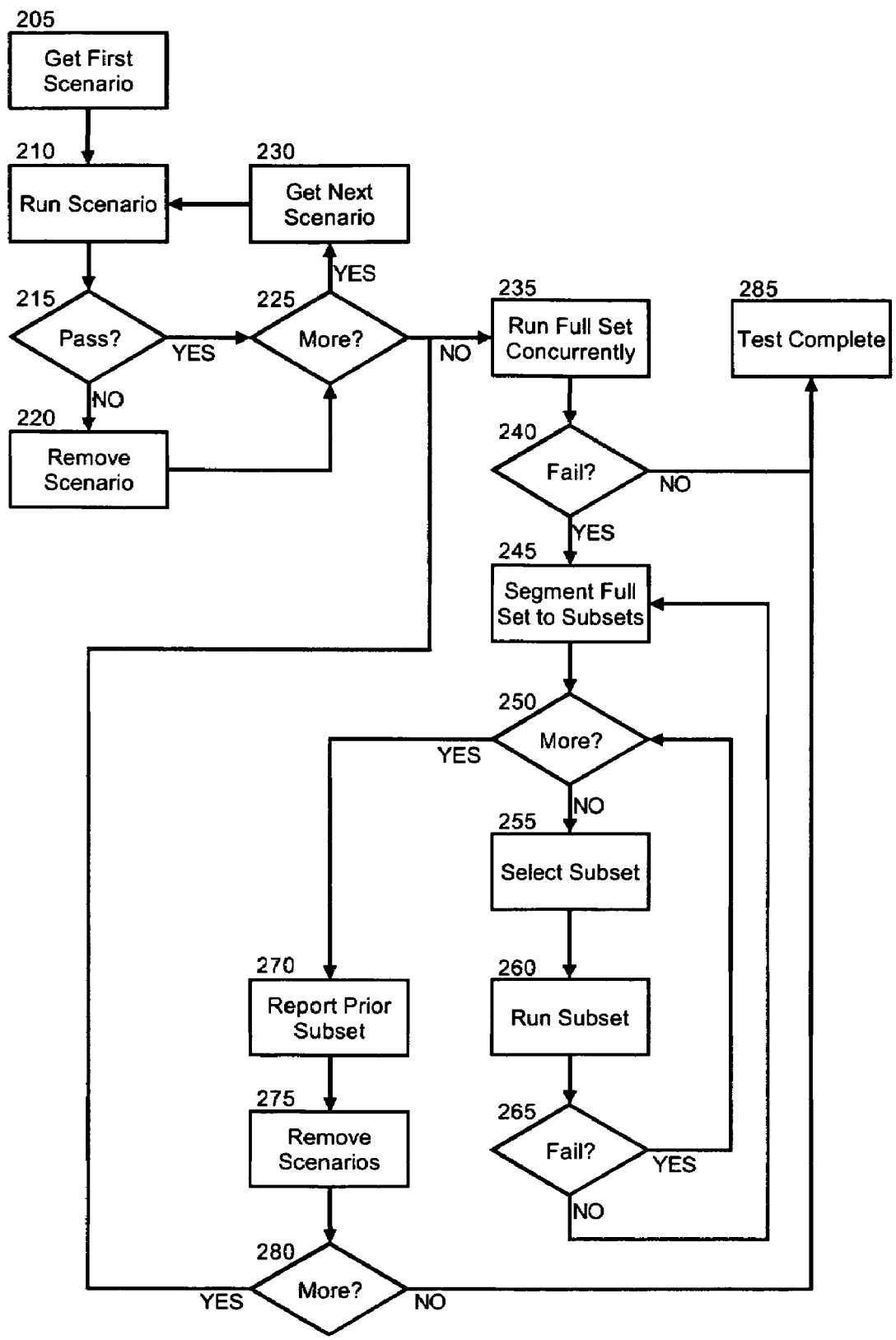
FIG. 2 is a flow chart illustrating a process for automated atomic system testing for use in the data processing system of FIG. 1; and, FIG. 3 is a pictorial illustration of an exemplary set of testing scenarios resulting from the operation of the process of FIG. 2.

In more particular illustration of the automated testing process, FIG. 2 is a flow chart illustrating a process for automated atomic system testing for use in the data processing system of FIG. 1. The process can begin in block 205 in which a first testing scenario in a group of testing scenarios can be retrieved for processing and in block 210 the scenario can be executed. In decision block 215, it can be determined whether the scenario passed the test or whether a failure is detected. If the scenario does not pass the test, in block 220 the scenario can be removed from the group of testing scenarios and can be addressed as a defect, but not included in further scenario sets. Regardless, in decision block 225, if further scenarios are to be executed singly, in block 230 a next scenario can be retrieved and the process can repeat for all of the scenarios in the group.

In block 235, the group of scenarios (excluding those scenarios which had been removed in block 220) can be executed concurrently and in decision block 240, it can be determined if a failure has been detected. If so, in block 245 the group of scenarios can be segmented into subsets and in decision block 250, it can be determined if more than one subset remains to be processed in the segmentation. If so, in block 255, a first subset can be selected for execution and in block 260 the selected subset can be executed. Subsequently, in decision block 265, it can be determined if a failure has been detected in consequence of the execution of the subset.

In decision block 265, if a failure is not detected, it can be presumed that the atomic scenarios forming the subset were not responsible for the initial failure condition. Otherwise, it can be presumed that the atomic scenarios forming the subset caused the initial failure condition. In this regard, in decision block 265, if a failure is not detected, a next segment can be tested by returning to decision block 250. Otherwise, if a failure is detected, the selected subset of atomic scenarios can be further decomposed into a new set of subsets in block 245 and the process can repeat through decision block 250.

In decision block 250, when no further subsets remain to be tested among the segmentation, it can be presumed that the prior subset caused the failure. To that end, in block 270, the prior subset can be reported as having caused the failure and the subset of testing scenarios can be removed from consideration in block 275. If more than two subsets remain to be processed, the full set of scenarios (excluding those scenarios which have been removed in block 275 and in block 220) can be executed concurrently. Otherwise, the testing cycle can complete in block 285.

Figure 3:
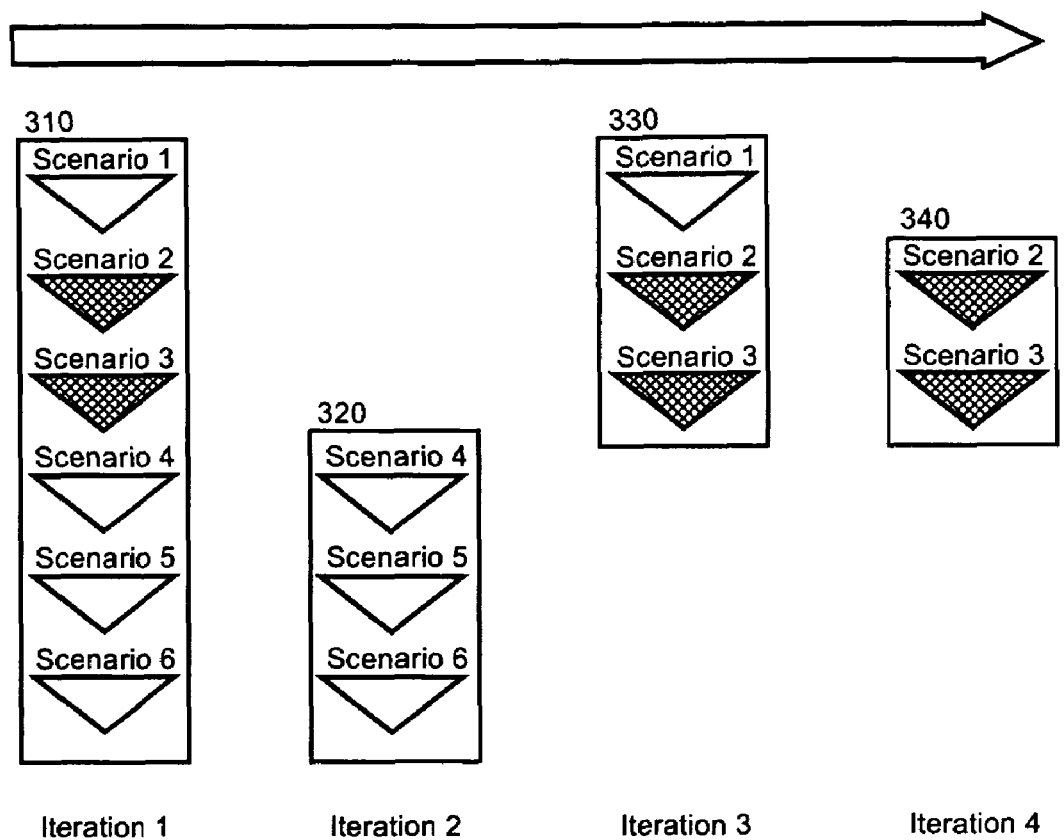

As an example, FIG. 3 is a pictorial illustration of a set of six testing scenarios of which the interaction between two causes a failure. Ordinarily, the pairwise testing of six scenarios would require fifteen separate tests to locate the offending scenario pair. Through the process of FIG. 2, however, only four tests are required. Specifically, in a first iteration 310, the scenarios can be halved to produce a subset which when tested in a second iteration 320 produces no errors. Thus, the remaining subset can be tested in the third iteration 330. Upon detecting a failure, the remaining subset can be further subdivided and in the fourth iteration 340, the offending pair of scenarios will have been revealed.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A machine implemented method for the atomic testing of a plurality of scenarios, comprising:
   generating a listing of interacting ones of the scenarios which are likely to cause a failure;
   storing the said listing to a memory; and,
   testing ones of the scenarios not included in said listing according to a binary search strategy to identify a subset of the scenarios as a source of failure among the scenarios.

2. The machine implemented method of claim 1, wherein generating comprises populating said listing with scenarios that are known to have interaction problems with one another.

3. The machine implemented method of claim 1, wherein said testing comprises:
   concurrently executing a full set of the scenarios not included in said listing to detect a failure; and,
   responsive to detecting a failure, decomposing said full set into subsets, concurrently executing at least one of said subsets to detect a failure, and repeatedly decomposing said subsets into further subsets and concurrently executing said further subsets until identifying a subset of scenarios causing said failure.

4. The machine implemented method of claim 1, further comprising updating said listing with newly identified interacting ones of the scenarios which are likely to cause a failure.

5. A machine implemented method for atomically testing scenarios for an application under test comprising:
   identifying a set of the scenarios that are known to have interaction problems with one another;
   recording to a memory said identified set in a listing;
   providing said listing as input to a testing tool; and,
   testing ones of the scenarios not included in said listing according to a binary search strategy to identify a subset of the scenarios as a source of failure among the scenarios.

6. The machine implemented method of claim 5, wherein said testing comprises:
   concurrently executing a full set of the scenarios not included in said listing to detect a failure; and,
   responsive to detecting a failure, decomposing said full set into subsets, concurrently executing at least one of said subsets to detect a failure, and repeatedly decomposing said subsets into further subsets and concurrently executing said further subsets until identifying a subset of scenarios causing said failure.

7. The machine implemented method of claim 5, further comprising updating said listing with newly identified interacting ones of the scenarios which are likely to cause a failure.

* * * * *